United States Patent [19]

Hagqvist

[11] Patent Number: 5,061,228

[45] Date of Patent: Oct. 29, 1991

[54] CONTINUOUSLY VARIABLE TRANSMISSION

[75] Inventor: Peter H. Hagqvist, Alvsjö, Sweden

[73] Assignee: Aktiebolaget Electrolux, Stockholm, Sweden

[21] Appl. No.: 663,253

[22] Filed: Mar. 1, 1991

[30] Foreign Application Priority Data

Mar. 5, 1990 [SE] Sweden .............................. 9000759

[51] Int. Cl.⁵ ............................................. F16H 13/08
[52] U.S. Cl. .................................... 475/189; 475/196
[58] Field of Search ............... 475/185, 186, 189, 196, 475/149

[56] References Cited

U.S. PATENT DOCUMENTS

| 2,490,525 | 12/1949 | Koller | 475/189 X |
| 2,536,992 | 1/1951 | Chester | 475/189 X |
| 3,892,134 | 7/1975 | Heuko | 475/189 X |
| 3,896,676 | 7/1975 | Walters | 475/189 X |

FOREIGN PATENT DOCUMENTS

| 1193755 | 5/1965 | Fed. Rep. of Germany | 475/189 |
| 1377487 | 2/1988 | U.S.S.R. | 475/196 |
| 1399548 | 5/1988 | U.S.S.R. | 475/196 |
| 2076911 | 12/1981 | United Kingdom | 475/189 |

Primary Examiner—Dwight Diehl
Attorney, Agent, or Firm—Pearne, Gordon McCoy & Granger

[57] ABSTRACT

This invention relates to a variable speed transmission for small high speed motors. The transmission comprises an input and an output shaft (11 and 21) the output shaft (21) being surrounded by two concentric annular plates (15, 16) being supported for rotating motion on the output shaft (21). The plates (15, 16) are in engagement with rolling elements (18) applied in a holder (20) for the elements secured on the output shaft (21) the plates being driven from the input shaft (11) via a drive roller (12) placed between and abutting the two plates.

10 Claims, 2 Drawing Sheets

CONTINUOUSLY VARIABLE TRANSMISSION

BACKGROUND OF THE INVENTION

This invention relates to a mechanical transmission which is preferably used in combination with small high speed motors, and more specifically to a continuously variable transmission for small tools and appliances.

PRIOR ART

Hand tools and small domestic machines, such as food processing machines, are usually driven by an electric motor which is sized to produce large torque at low speeds. Such motors are generally voltage or thyristor controlled to provide variable speed. Relatively large motors must be chosen to accommodate this combination. Alternatively, conventional mechanical gears may be used with a smaller high speed motor, but the flexibility of continuously variable speed control is sacrificed. Mechanical restriction gearing has the additional disadvantages of being heavy and bulky with any space or weight reduction resulting from selection of a smaller motor being lost because of the additional space needed to accommodate the gearing and because of the added weight of the gearing. Moreover, gearing which is often used for this purpose is relatively inefficient.

SUMMARY OF THE INVENTION

In accordance with the present invention, a novel and improved transmission, comprised of simple machine elements, provides a continuously variable speed reduction with large speed reduction permitting the use of a high speed drive motor. Since high speed motors have a large power to weight ratio relative to other types of motors, a compact system is created where the motor always operates at an optimum torque to speed ratio. The invention offers a continuously variable speed on the output shaft which for example can range from between 0 to 2000 rpm.

DETAILED DESCRIPTION OF THE INVENTION

Figure 1:
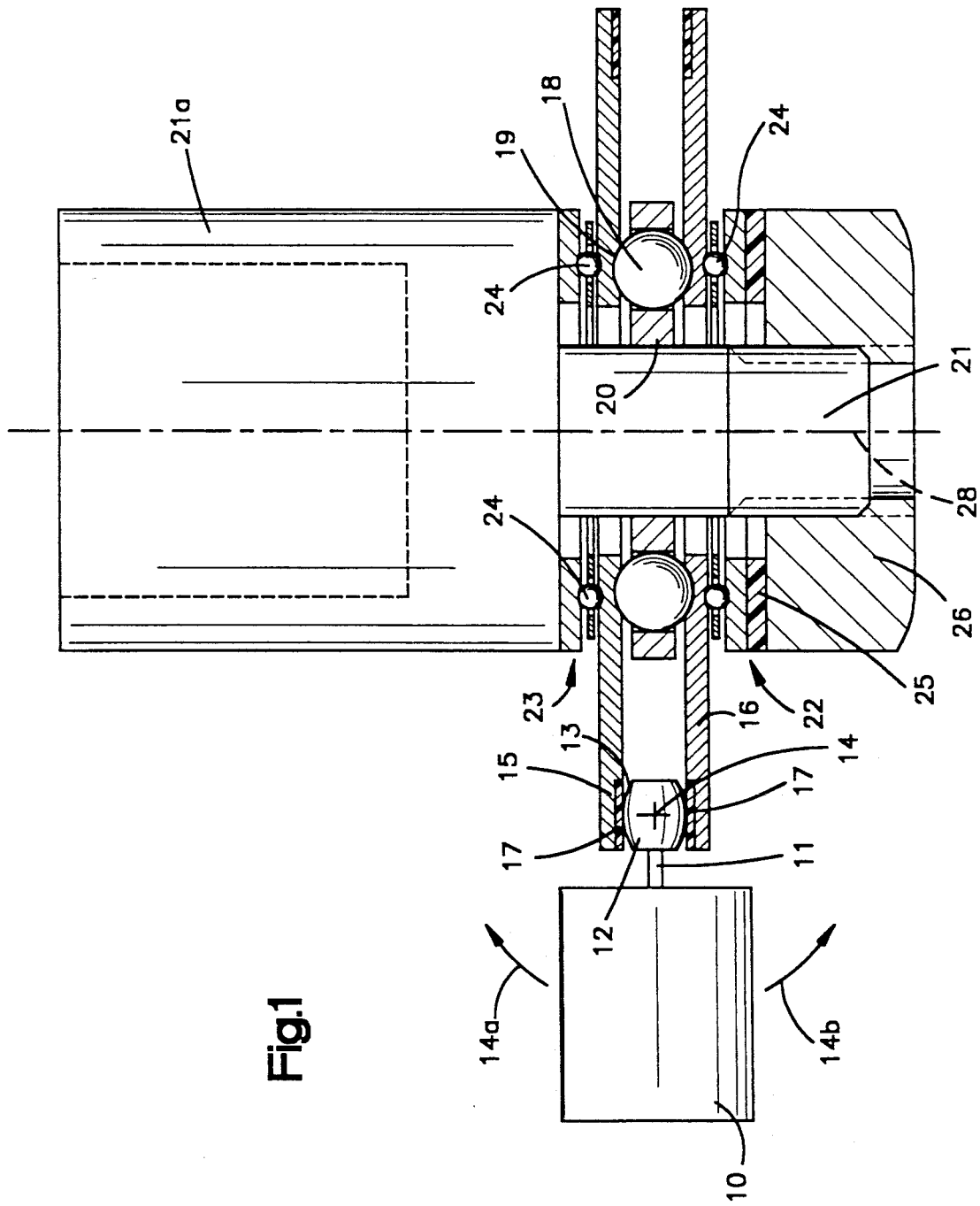
FIG. 1 shows an elevational cross section of a transmission in accordance with the present invention.
Figure 2:
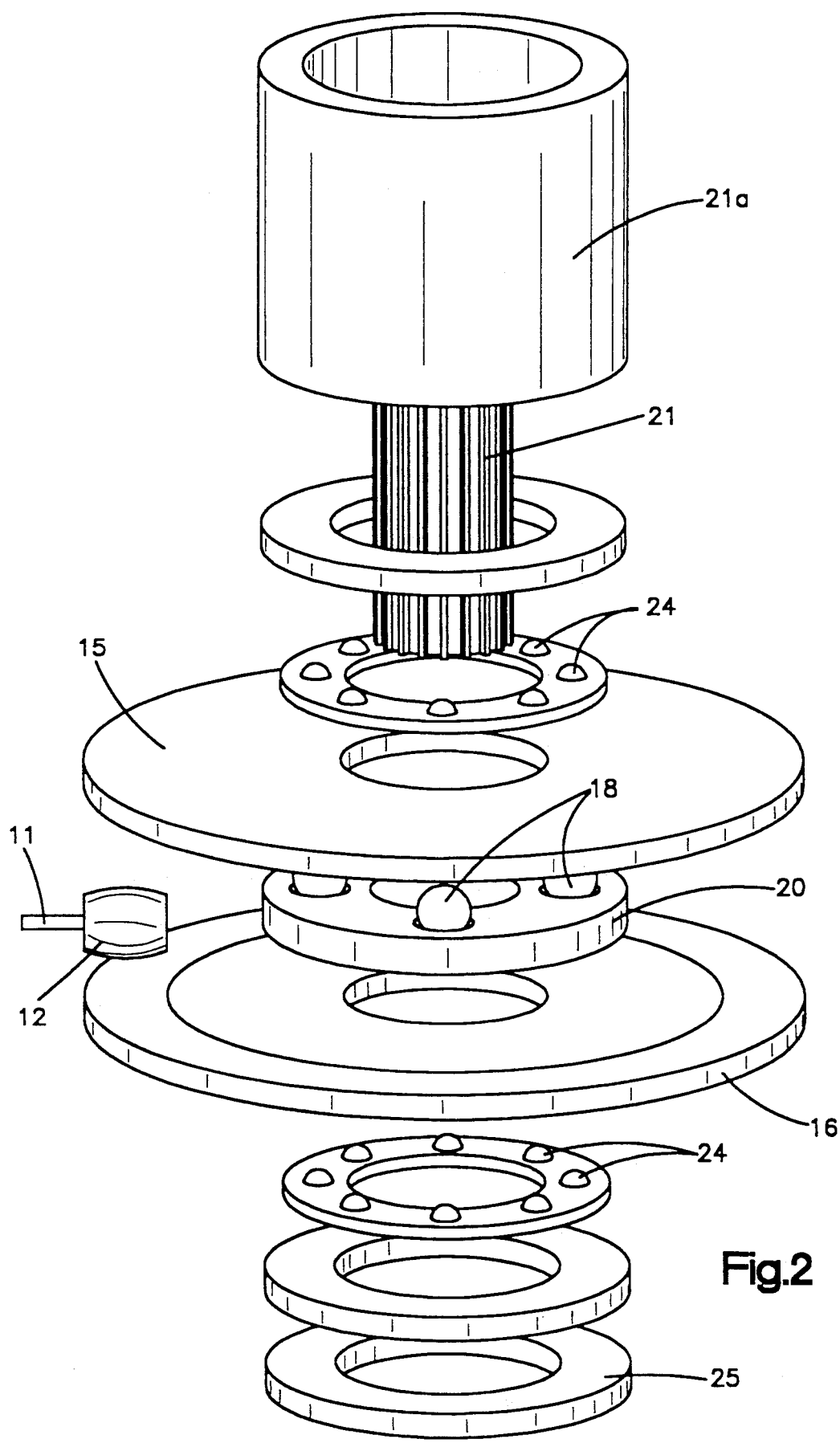
FIG. 2 shows an exploded perspective view of the transmission of FIG. 1.

Referring to the drawings, a high speed motor 10 coupled to an input shaft 11 has at its end drive roller 12 with a cambered surface 13. The drive roller 12 can together with the shaft 11 and the motor 10 be turned about or rotated on an axis 14 as indicated by arrows 14a, 14b which is mutually perpendicular to the longitudinal direction of shaft 11 and the axis of rotation of an output shaft 21 rotationally driving an element 21a.

At the opposite sides of the drive roller 12 there are annular plates 15 and 16 which by means of spring forces are urged towards the drive roller 12 so that a friction engagement is established between the plates and the drive roller. The effectiveness of the friction engagement may be improved by providing the surface of the roller and/or an outer peripheral part of the plates 15, 16 with friction layers 17.

Between the plates 15 and 16 there is at the radially inner part several rolling elements 18 running in recesses 19 in the plates 15 and 16. These rolling elements, which can for instance be ball-shaped, cooperate with a holder 20 which is rigidly fixed to an output shaft 21 to cause the output shaft to rotate about the axis 28 when the plates 15, 16 are caused to rotate at different speeds in opposite directions. On each side of the plates 15, 16 there is a thrust bearing 22, 23 with balls 24 between which plates 15 and 16 and the rolling elements 18 are clamped by means of a spring 25 resting against a nut 26 on the end of the output shaft.

The device operates in the following way. At the working condition shown in FIG. 1 the abutting points between the drive roller 12 and the plate 15 and 16 are placed at equal distances from the rolling elements 18. This means that when the drive roller 12 starts to rotate by means of the motor 10 the plates 15 and 16 will rotate about the output shaft 21 with the same speed but in different directions. This means that the holder 20 and hence the output shaft 21 stand idle.

In order to achieve a rotating motion of the output shaft 21, the motor 10, the shaft 11, and the roller 12 are turned, as a unitary assembly, about the axis 14. If the motor is moved upwards (arrow 14a) from the position depicted in FIG. 1, then the abutting point between the drive roller 12 and the plate 15 is moved outwards from the output shaft 21 and the abutting point between the drive roller 12 and the plate 16 is moved inwards toward the input shaft. This causes the rotational speed to increase for the plate 16 and decreases for the plate 15 which in turn means that the rolling element 18, depending on the change of relative movement between the plates 15 and 16, act on the holder 20 and hence the output shaft 21 causing it to rotate. By increasing or decreasing the angle about the axis 14 it is possible to achieve a continuous variation of the speed of the output shaft. The output shaft can also be driven in the other direction by turning the motor downwards (arrow 14b). The speed of the output shaft is a direct function of the difference between the speed of the two plates 15, 16.

While what is presently considered to be the most practical and preferred embodiment of the invention has been described, it should be understood that the invention is not to be limited to the disclosed embodiment, but is intended to cover various modifications and equivalent arrangements included within the spirit and scope of the appended claims.

What is claimed is:

1. A transmission comprising:
   an input and an output shaft,
   two parallel plates arranged perpendicularly to the output shaft,
   supporting means for permitting free rotation of said plates about the output shaft,
   a plurality of rolling elements arranged between said plates and radially distributed about said output shaft with each of said rolling elements abutting each of said plates,
   a holder having a plurality of slots equal to the number of rolling elements,
   said holder being fixed to the output shaft at a position between said plates with each of said rolling elements being restricted within one of said slots,
   a drive roller fixed to said input shaft, said drive roller being positioned between and abutting each of said plates, and
   said drive roller operating to rotate said plates in opposite directions, said rolling elements rotating said holder and in turn said output shaft with a velocity which is a direct function of the differences in the rotational speed of said plates.

2. A transmission as recited in claim 1, wherein the rotating motion of the drive roller (12) is transferred to the plates (15, 16) by friction engagement.

3. A transmission as recited in claim 1, wherein the drive roller (12) is shaped as a roller having a surface which is at least partly cambered.

4. A transmission as recited in claim 1, wherein the drive roller (12) is turnably arranged about an axis (14) placed between the two plates (15, 16), said axis being contained in a plane perpendicular to the axis of rotation of said output shaft (21).

5. A transmission as recited in claim 1, wherein the drive roller (12) is placed near the periphery of the plates (15, 16).

6. A transmission as recited in claim 1, further comprising a motor (10) which is connected to rotate said input shaft (11) and the drive roller (12).

7. A transmission as recited in claim 1, wherein the plates (15, 16) are arranged to be pressed towards each other.

8. A transmission according to claim 7, characterized in that the plates (15, 16) are pressed towards each other by means of a spring (25).

9. A transmission according to claim 1, characterized in that the drive roller (12) and/or the parts of the plates (15, 16) engaging the drive roller are provided with friction layers (17).

10. A transmission according to claim 1, wherein the two plates (15, 16) are clamped between two thrust bearings (24, 25).

* * * * *